Jan. 24, 1939.  W. A. GUNTER  2,145,222
AIR CONDITIONING
Filed July 3, 1936
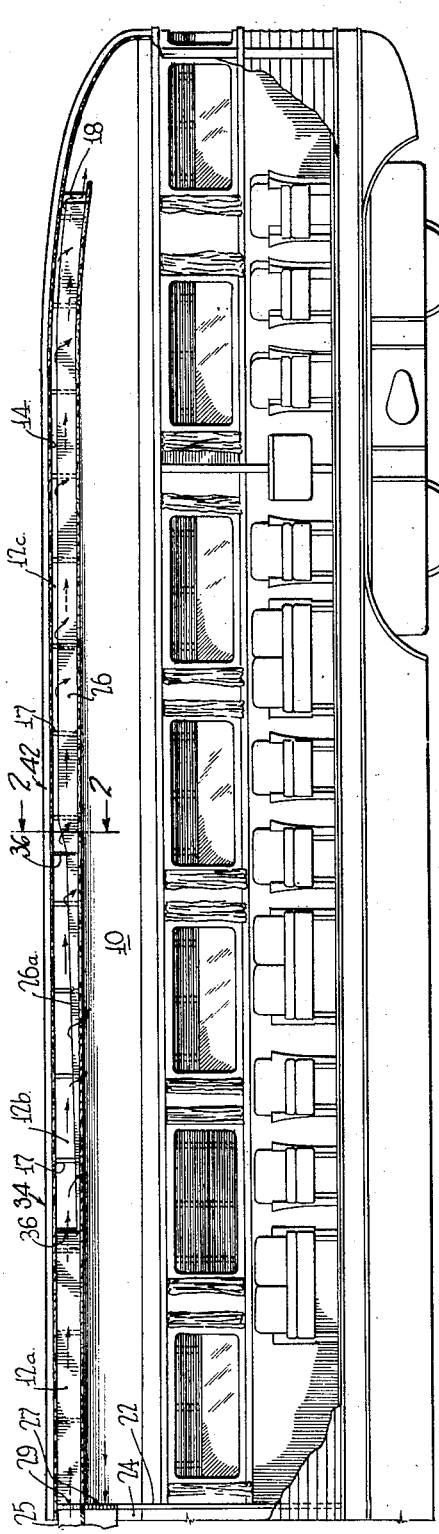
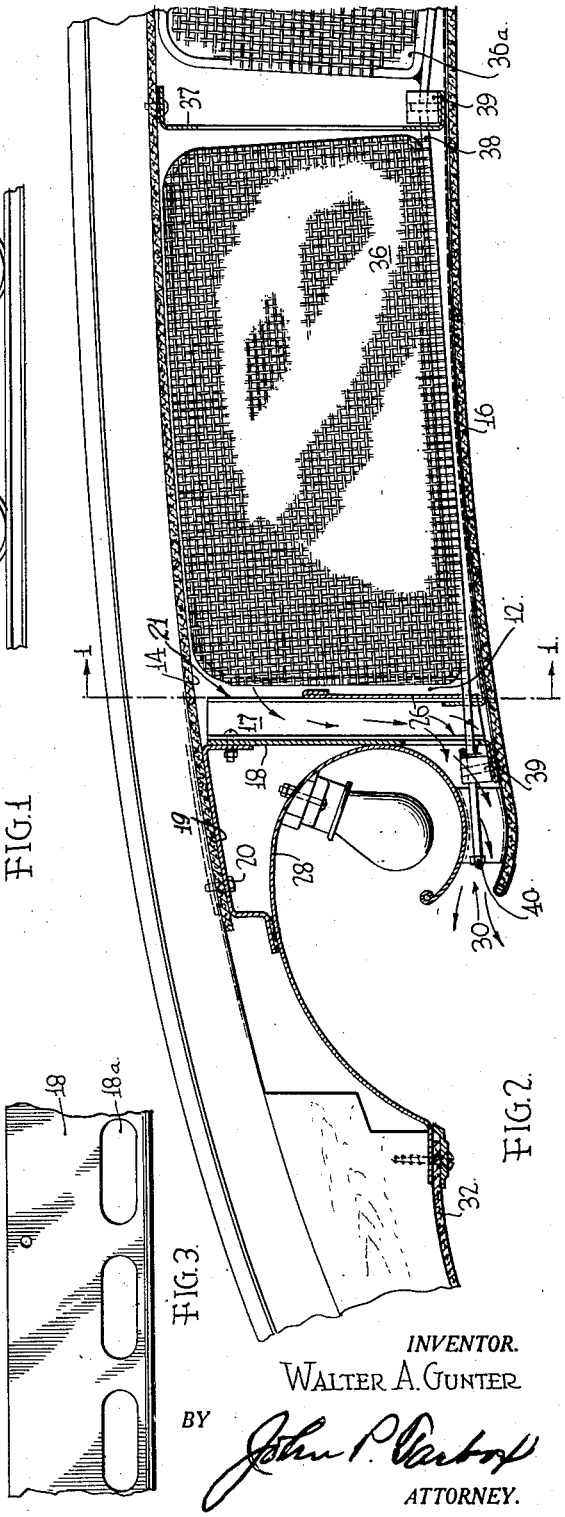
INVENTOR.
WALTER A. GUNTER
BY
ATTORNEY.

Patented Jan. 24, 1939

2,145,222

UNITED STATES PATENT OFFICE 2,145,222

AIR CONDITIONING

Walter A. Gunter, Upper Darby, Pa., assignor to Edward G. Budd Manufacturing Company, Philadelphia, Pa., a corporation of Pennsylvania Application July 3, 1936, Serial No. 88,839

9 Claims. (Cl. 98—14)

This invention relates to improvements in air conditioning ducts and more particularly to a variable baffle for uniform distribution of air in long ducts, especially as in rail car bodies.

The present trend toward air conditioning of vehicle bodies, more particularly rail coaches, requires the distribution of relatively large volumes of conditioned air, which is continuously introduced and removed for the necessary re-circulating treatment in the air treating equipment. The distribution of such a large amount of air is a difficult problem however, for it must have a sufficient velocity to reach the end of the long cars but not such as to cause sensible drafts on the occupants of the car. Ordinarily high velocity air exists only with low static pressure and this would limit the distribution whereas with high static pressures, there is a sensible draft which is objectionable. Furthermore, the distributing space and location of ducts is limited in the present day streamlined trains.

It is the principal object of this invention to provide an air distributing duct for a rail car which is adapted to be mounted on the ceiling thereof and which is baffled to maintain a static pressure proportional to the duct opening throughout its length for distributing a uniform volume of air at the various discharge openings throughout the length of the car body.

Another object of this invention is to provide an air distributing duct which is provided with an auxiliary baffle extending along the duct and controlling the discharge of air throughout the length of the duct, it being provided at the inlet end with a closed portion to prevent short circuiting of the air and being provided with a variable width portion along the length of the duct, whereby the static and velocity pressures may be balanced for a low velocity uniform distribution of air.

A more specific object of my invention is to provide a combined longitudinally extending light duct and air conditioning duct for a rail car body in which the air conditioning duct is provided with transverse adjustable screen baffles to increase the static pressure along the length of the duct and to control the discharge of air from the duct by a variation in the opening, such variation being dependent, approximately, on a straight line function of the decrease of the velocity pressure and increase of the static pressure.

Further objects and advantages of my invention will appear from the following description of a preferred form of embodiment thereof, taken in connection with the attached drawing illustrative thereof and in which:

Figure 1 is a side elevation with parts broken away of a part of a rail car in which the improved air conditioning duct is installed, the duct being shown as would appear on a section along the line 1—1 of Fig. 2.

Figure 2 is an enlarged transverse vertical section through a portion of the air conditioning duct and light duct substantially on the line 2—2 thereof showing the location of the baffle, and Figure 3 is a detailed elevation of the duct supports and openings.

The rail car 10 generally shown in Figure 1, is intended to represent a part of one car of a train in which the air conditioning duct 12 is placed, such construction being fitted to the ceiling 14 in accordance with a preferred form of embodiment of my invention.

This duct includes an imperforate false ceiling member 16, as shown in Figure 2, supported by a longitudinally extending support 17 carrying a perforated supplementary control or distribution plate 18, the details of which are shown in Figure 3. The supports 17 and plate 18 are secured to the ceiling 14 by an intermediate bracket 19 held by screws 20 and the entire area between the ceiling 14, false ceiling 16 and the respective plates 18, thus becomes the air conditioning duct 12. It is open on its sides and is adapted to distribute the necessary volume of air uniformly throughout the car body 10.

In this specific construction, the duct 12 extends from the dividing partition 22 which forms an end wall of vestibule 24 to the rear of the car 10, and a separate duct may be provided for the forward passenger portion of the car body. The supply of air is from chamber 25, and it is delivered through grille 29, the air being returned to the air conditioning equipment chamber 25 through return grille 27 also in partition 22. It is, of course, to be understood that with a longer car which is unbroken by a central vestibule, the duct would be longer.

At the sides of this form of air conditioning duct 12 is a baffle 26 which may be continuous from the vestibule partition 22 to the end of the duct 12 and back to the partition 22, thus extending along both sides of the duct. As shown in elevation in Figure 1, this baffle is carried by the false ceiling 16 and extends upward toward ceiling 14, leaving a variable width opening 21 through which the air escapes, and due to the proximity of the light duct 28, the direction of flow is thence downward and outward through openings 18a and thence through the opening 30 below the light duct. The light duct 28 which is conveniently of spiral form, in turn extends to the ceiling quarter 32 and prevents air pockets from forming and acts as a distributor for the air discharged.

Assuming a sufficient volume and velocity of air for the adequate supply of the passengers in the rail car body, the air enters from chamber 25 through an opening 29 in the partition 22, entering the duct 12 which, however, is closed on its bottom and sides in the region 12a up to the baffle partition plane 34. The distance from the partition 22 to partition plane 34 is such that the return air which enters the return grille 27 in the partition 22 will not consist entirely of air discharge from the duct 12 before it can be used in the car body. It is found that the distribution of air in the range 12b and 12c between the baffle partition plane 34 and the remainder of the duct is adequate for complete air conditioning of the entire compartment.

The velocity of the air in this closed wall portion 12a of duct 12 is high, and as there are no obstructions, the static pressure is low, and in order to force the air from the duct beyond the closed region, a transverse baffle, represented at 36 in Figure 2, is placed at the baffle partition plane 34. For convenience, two separate but duplicate baffles 36, and 36a are provided, each of which is placed in the respective half of the duct 12, the duct being divided by perforated plate 37.

The baffle 36, as shown in detail in Figure 2, is conveniently a wire mesh screen as for example quarter inch mesh #16 gauge bronze screening and suitably mounted on a shaft 38 for adjustment purposes. The shaft 38 is carried in suitable bearings 39 and is adapted for rotational adjustment by the nut 40. Such baffles will tend to balance the pressure in the respective longitudinal sections of the duct so that there will be an equal air distribution out each side. In addition, the resistance is such that an adequate static pressure is built up for a suitable and uniform distribution of air from the duct. Ordinarily but a single adjustment is necessary as the characteristics of the blowers (not shown) do not change and after being once set the balance between the respective sides is always substantially uniform.

In the range 12b between the baffle partition plane 34 at which point the primary baffle is mounted and extending to the secondary baffle partition plane 42, the differential pressure baffle 26 is provided with a baffle edge 26a, sloping from a maximum opening at the baffle partition plane 34 to a minimum opening approximately one half way to the end of the car or at the partition plane 42. The remaining portion 12c of the duct from baffle partition plane 42 to the end is provided with a uniform opening with the top of the baffle 26 uniformly spaced from the ceiling 14 of the car body.

The secondary baffle partition plane 42 has similar transverse baffles such as illustrated at 36, and they also tend to balance the distribution of air from side to side of the duct and to create a sufficient resistance to the high velocity flow of air, so that there will be a uniform static pressure for air discharge in the latter half of the car body.

The slot opening of the main duct throughout the last half of its length in a preferred construction is approximately one and one-half inches in width, which will give an outlet velocity of below 200 feet per minute based on an average duct length of 50 feet, and delivering 1800 cubic feet per minute. Variations will, of course, be obtained for other installations by changing any of the three characteristics of length, velocity and volume.

The arrangement of air and indirect light ducts along the ceiling of the car body gives a very pleasing artistic effect and eliminates unsightly air duct openings. The distribution of air is substantially uniform throughout the length of the car body and direct drafts or zones of unequal distribution are eliminated so that no particular seat is uncomfortable. The open side duct is not the only type possible, however, for it is merely necessary to have a uniform flow of air along the length of the car which is obtained by the differential baffle and opening, after which the air is to be uniformly directed to the various parts of the car body which is accomplished in the preferred construction by the distributor plate 18 and the rear part of the light reflector.

If desired, a single longitudinal baffle could be used, as for example by establishing a variable width opening in the bottom of the duct corresponding to opening 21, and the air escaping out of such openings would be distributed by an equivalent distributor plate such as plate 18 with the air discharged laterally as by impinging on central lighting fixtures under the respective distributor plate openings. Similar results of uniform distribution would be obtained by the use of single vertical transverse static pressure creating baffles. The exposed lighting fixtures of this construction may be preferred under some circumstances.

While I have shown and described a preferred form of embodiment of my invention, I am aware that other modifications may be made thereto, and I therefore desire a broad interpretation of my invention within the scope and spirit of the disclosure herein and of the claims appended hereinafter.

What I claim is:

1. A longitudinally extending duct for distributing conditioned air having an intake at one end, transverse baffles at spaced intervals along the length of the duct, said duct having a longitudinal opening for the discharge of air, means to adjust said transverse baffles for the uniform distribution of air out of said duct opening, and an air distributor plate adjacent the duct opening for controlling the direction of the air flow.

2. A longitudinally extending duct for distributing conditioned air having an intake at one end and discharge openings along the length thereof, a transverse baffle intermediate the length of said duct to establish a static pressure, and a variable height baffle extending along the length of the duct and varying the discharge openings at a rate generally inversely proportional to the static pressure in the duct.

3. An air conditioning system for a rail car including a duct having closed walls except for an opening through which the air is adapted to be discharged, an inlet at one end of said duct, a return air grille adjacent the inlet, means to prevent short circuiting of the air from the inlet to the return air grille, baffle means extending transversely of the duct to establish a static pressure in said duct, and baffle means adjacent the duct opening to control the discharge of air through the opening of said duct adjacent said static pressure creating means.

4. A composite ceiling duct for a vehicle body having curved ceiling quarters, said duct including a central substantially hollow box-like chamber adapted to convey air, and having openings in the walls thereof, a plurality of outwardly and downwardly opening indirect lighting ducts of spiral shape in cross-section said lighting ducts being adjacent the respective sides of the air conveying chamber and controlling the direction of the air discharged from said chamber, a part of the bottom of the said chamber extending beneath said light ducts to substantially conceal them from view of passengers in said body, and a baffle of variable elevation extending alongside of said duct openings and limiting the discharge of air therethrough.

5. An air conditioning duct for the distribution of air which comprises upper and lower substantially smooth and closed surfaces, transversely extending baffles determining the static pressure in said duct and a longitudinal baffle extending between the upper and lower surfaces and forming a variable opening for controlling the distribution of air out of the duct.

6. A rail car air conditioning system including a longitudinally extending duct for distributing conditioned air having a top and bottom wall, a baffle member extending partly between said walls to form an opening for the uniform distribution of air, said duct having an inlet opening, said baffle forming a relatively decreasing opening with the top wall of the duct in the direction of flow of the air, a return air grille adjacent the inlet opening, a portion of the duct being entirely closed adjacent the inlet opening and a substantial distance therebeyond to prevent undesired re-circulation of air into said return air grille.

7. In combination with a rail car of the class described an air conditioning duct secured adjacent the ceiling thereof and having a closed bottom wall spaced from the ceiling, and a baffle extending between the bottom wall and the ceiling through a portion of the length of the duct, said baffle forming an opening for the distribution of air throughout a major portion of the length of the duct, and transverse baffle means disposed at spaced intervals in said duct to create a static pressure for the uniform distribution of air into the car along the length of the duct.

8. In combination with a rail car of the class described an air conditioning duct secured adjacent the ceiling thereof and having a closed bottom wall spaced from the ceiling, and baffles extending between the bottom wall and the ceiling through a portion of the length of the duct, said baffles forming an opening for the distribution of air throughout a major portion of the length of the duct, and means disposed in said duct to create a static pressure for the uniform distribution of air along the length of the duct, said means being adjustable to vary the static pressure from side to side of the duct.

9. An air conditioning duct for a relatively long chamber, said duct having a closed top and bottom portion, baffles extending along the sides of the ducts to form the discharge openings, said baffles having a uniformly increasing size to form a uniformly decreasing opening, and means to create a static pressure inversely proportional to the size of the opening, said means including a low resistance open mesh baffle transverse of said duct, said baffle being adjustable to maintain a uniformity of pressure on the respective sides of the duct.

WALTER A. GUNTER.